United States Patent
Wu et al.

(10) Patent No.: US 7,065,043 B2
(45) Date of Patent: Jun. 20, 2006

(54) METHOD AND SYSTEM FOR CONNECTING TO A PROXY SERVER WITH THE LOWEST WORKLOAD THROUGH QUERYING A LOAD MONITOR

(75) Inventors: JianMin Wu, San Jose, CA (US);
Shih-An Cheng, Milpitas, CA (US);
Chen-Huei Chang, Cupertino, CA (US)

(73) Assignee: Innomedia PTE Ltd., The Alpha (SG)

( * ) Notice: Subject to any disclaimer, the term of this patent is extended or adjusted under 35 U.S.C. 154(b) by 954 days.

(21) Appl. No.: 10/036,001

(22) Filed: Dec. 24, 2001

(65) Prior Publication Data

US 2003/0118011 A1  Jun. 26, 2003

(51) Int. Cl.
*G08C 15/00* (2006.01)
*H04L 12/26* (2006.01)
*G06F 9/46* (2006.01)

(52) U.S. Cl. ................. 370/229; 370/252; 370/352
(58) Field of Classification Search ........ 370/229–235, 370/252, 352; 718/105
See application file for complete search history.

(56) References Cited

U.S. PATENT DOCUMENTS

| | | | | |
|---|---|---|---|---|
| 6,092,178 A | * | 7/2000 | Jindal et al. .................. | 712/27 |
| 6,128,279 A | * | 10/2000 | O'Neil et al. ................ | 370/229 |
| 6,141,341 A | | 10/2000 | Jones et al. .................. | 370/352 |
| 6,259,691 B1 | | 7/2001 | Naudus ......................... | 370/352 |
| 6,442,165 B1 | * | 8/2002 | Sitaraman et al. ........ | 370/395.4 |
| 6,601,084 B1 | * | 7/2003 | Bhaskaran et al. ......... | 718/105 |
| 6,671,259 B1 | * | 12/2003 | He et al. ..................... | 370/238 |
| 6,772,211 B1 | * | 8/2004 | Lu et al. ..................... | 709/226 |
| 6,795,867 B1 | * | 9/2004 | Ma et al. ..................... | 709/240 |
| 6,947,385 B1 | * | 9/2005 | Havens ........................ | 370/236 |
| 2003/0056002 A1 | * | 3/2003 | Trethewey ................... | 709/238 |

FOREIGN PATENT DOCUMENTS

WO  WO 01/05515 A2  1/2001
WO  WO 01/76276 A2  10/2001

* cited by examiner

*Primary Examiner*—Chau Nguyen
*Assistant Examiner*—Kerri M. Dyke
(74) *Attorney, Agent, or Firm*—Renner, Otto, Boisselle & Sklar, LLP

(57) ABSTRACT

A system and method for providing a Voice-over Internet Protocol (VoIP) system is disclosed. The VoIP system includes a network including at least two VoIP proxy servers configured to allow voice data to be transmitted and received over the network. The VoIP system also includes at least one VoIP client operatively coupled to the network to transmit and receive voice data over the network and a load monitor device configured to monitor workload on the at least two VoIP proxy servers and determine an identity of the VoIP proxy server with a lowest workload. The load monitor device is also configured to provide the identity of the VoIP proxy server with the lowest workload to the at least one VoIP client so that the at least one VoIP client can connect to the VoIP proxy server with the lowest workload to transmit and receive voice data.

8 Claims, 5 Drawing Sheets

METHOD AND SYSTEM FOR CONNECTING TO A PROXY SERVER WITH THE LOWEST WORKLOAD THROUGH QUERYING A LOAD MONITOR

TECHNICAL FIELD

The present invention generally relates to Internet Protocol (IP) telephony and, more specifically, relates to a method and system for connecting to a proxy server with the lowest workload through querying a load monitor.

BACKGROUND ART

IP telephony is a collection of technologies that emulates and extends today's circuit-switched telecommunications services to operate on packet-switched data networks based on the Internet Protocol (IP). IP telephony encompasses the terms "Internet Telephony", "voice-over-IP" (VoIP), "video-over-IP", and "fax-over-IP", and extends those capabilities even further to include new telecommunications applications made possible by the convergence of voice, video and data. "Voice-over-IP" (VoIP) technology enables the real-time transmission of voice signals as packetized data over "IP networks" that employ the Transmission Control Protocol (TCP), Real-Time Transport Protocol (RTP), User Datagram Protocol (UDP), and Internet Protocol (IP) suite, for example.

A conventional Public Switched Telephone Network (PSTN) provides its users with dedicated, end-to-end circuit connections for the duration of each call. Based on the calling and called parties' numbers, circuits are reserved among an originating switch, any tandem switches along the route between the two ends of the call, and a terminating switch. Signaling between these PSTN switches supports basic call setup, call management, and call teardown as well as querying of databases to support advanced services such as local number portability, mobile subscriber authentication and roaming, virtual private networking, and toll-free service.

The conventional PSTN has served voice traffic well over the last 100 years, but its success has been paralleled by a rise of separate networks to support data traffic. These separate networks include, for example, the World-Wide Web which is commonly referred to as the Internet, an Intranet, a wide-area network (WAN), a local area network (LAN), an ATM, a T1 network, an E1 network, an Ethernet, a microwave network, a satellite network or the like, or a combination thereof. Clearly, use of distinct networks for voice and data represents an additional burden to service providers and an additional cost to consumers. As more and more PSTN traffic becomes data-oriented, however, the trend toward voice and data network convergence becomes stronger and stronger. Service providers, Internet service providers, and manufacturers of switching, transmission, and customer premises equipment are all participating in a significant shift of the telecommunications industry toward combined voice/video/data networking using IP.

The shift to IP telephony promises better efficiencies in the transport of voice and data, and, as a result, lower telecommunications costs to end users. Moreover, as IP telephony evolves, it will be able to match all the features of voice communications currently supported by the PSTN. Interoperability among the IP telephony products of different vendors is the first major hurdle to overcome. The real promise of IP telephony, however, will be realized with the next wave of advanced services that will begin to surpass the capabilities of the PSTN.

There are, however, some drawbacks associated with existing IP telephony systems. For example, in VoIP systems, most VoIP clients need to connect to a VoIP proxy server in order to complete a call. After the VoIP client connects to a VoIP proxy server, the overall system can provide services for the VoIP client. In conventional systems, many VoIP clients attempt to connect to a designated VoIP proxy server at the same time. This increases the workload on the designated VoIP proxy server, even though other VoIP proxy servers in the VoIP system may have much lower workloads. This occurs even if the VoIP client connects to VoIP proxy servers connected in a conventional round robin manner. Round robin connection does not guarantee that the workload will be equally distributed among the VoIP proxy servers. In many instances, the VoIP client lacks information on the workload of each VoIP proxy server and is unable to connect to the optimal VoIP proxy server, i.e., a VoIP proxy server with the lowest workload.

Therefore, there exists a strong need in the art for a system and method which identifies and utilizes the VoIP proxy server with the lowest workload. Such a system and method would provide the identity of the VoIP proxy server with the lowest workload to the VoIP client in order to more efficiently complete the call.

SUMMARY OF THE INVENTION

According to one aspect of the invention, the invention is a Voice-over Internet Protocol (VoIP) system. The VoIP system includes a network including at least two VoIP proxy servers configured to allow voice data to be transmitted and received over the network. The VoIP system also includes at least one VoIP client operatively coupled to the network to transmit and receive voice data over the network and a load monitor device configured to monitor workload on the at least two VoIP proxy servers and determine an identity of the VoIP proxy server with a lowest workload. The load monitor device is also configured to provide the identity of the VoIP proxy server with the lowest workload to the at least one VoIP client so that the at least one VoIP client can connect to the VoIP proxy server with the lowest workload to transmit and receive voice data.

According to another aspect of the invention, the invention is a method for connecting at least one Voice-over Internet Protocol (VoIP) client to a VoIP system, wherein the VoIP system comprises a network of at least two VoIP proxy servers, a load monitor device and a VoIP proxy server has a lowest workload. The method includes the steps of monitoring the at least two VoIP proxy servers for an indication of workload and identifying which VoIP proxy server has the lowest workload. The method further includes the step of connecting of the at least one VoIP client to the VoIP proxy server with the lowest workload in order to transmit and receive voice data.

BRIEF DESCRIPTION OF DRAWINGS

These and further features of the present invention will be apparent with reference to the following description and drawings, wherein.

DISCLOSURE OF INVENTION

To illustrate the present invention in a clear and concise manner, the drawings may not necessarily be to scale and certain features may be shown in a partial schematic format.

The present invention is a VoIP system including a load monitor with which a VoIP client communicates with before it connects to an optimal VoIP proxy server, i.e., a VoIP proxy server with the lowest workload. Further, the invention includes a method for determining and identifying the optimal VoIP proxy server based on workload data collected by the load monitor. Further, the method includes providing the identity of the VoIP proxy server to the VoIP client so that the VoIP client may connect. In one embodiment, the load monitor is programmed to continuously or periodically collect workload data from each VoIP proxy server. When the load monitor receives a query from a VoIP client wanting to connect to the VoIP system, the load monitor determines and identifies the VoIP proxy server with the lowest workload by IP address, for example. In response to the query, the load monitor provides the identity of the VoIP proxy server to the VoIP client. The VoIP client then connects to the identified VoIP proxy server and accesses the VoIP system. Thus, the load monitor balances the workload of VoIP proxy servers.

Figure 1:
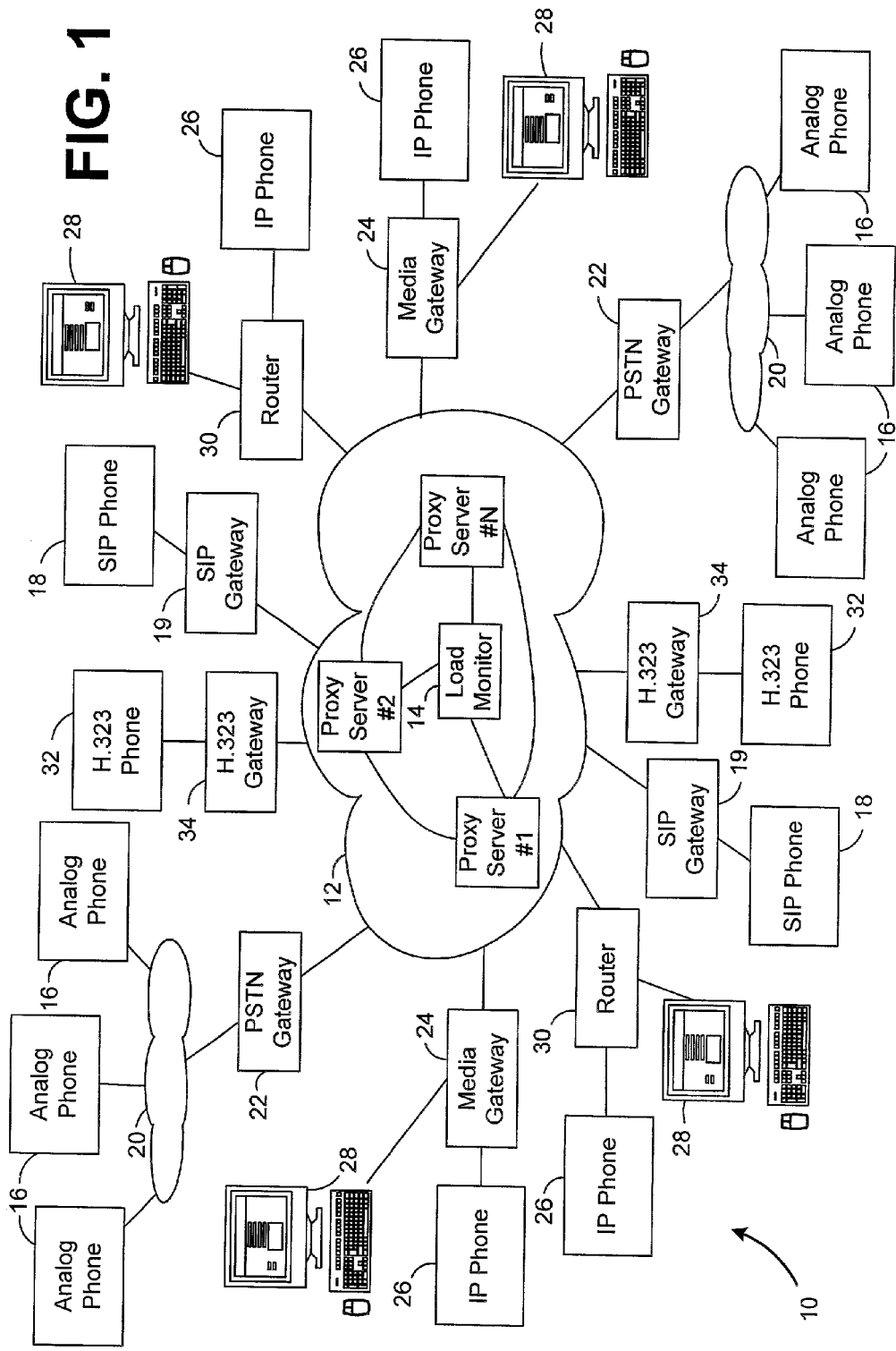
FIG. 1 is a system level diagram of a VoIP system including a load monitor according to an embodiment of the present invention.

Referring initially to FIG. 1, an embodiment of a VoIP system, generally designated as 10, is shown. The VoIP system 10 includes a digital data network over which digitized voice signals are transmitted as a stream of packets. The underlying digital data network may be an IP network 12, for example, a proprietary network, a network of leased facilities, the Internet, an Intranet, a WAN, a LAN, a virtual private network (VPN), or the like, or a combination thereof. Within the IP network 12 are a plurality of VoIP proxy servers, for example, servers #1 through #N. The plurality of VoIP proxy servers are coupled together, for example, via conventional network routing or other means known by those with ordinary skill in the art. A load monitor 14 is coupled to servers #1 through #N, for example, via conventional network routing or other means known by those with ordinary skill in the art. The operation of the load monitor 14 in relation with servers #1 through #N, a transmitting or calling VoIP client, and a receiving VoIP client will be further explained below with reference to FIGS. 2–5. It should be understood that included in the IP network 12 will be other network devices to complete the network such as gateways, routers, switches, etc. (not shown).

A plurality of conventional analog phones 16 may be coupled to the IP network 12 via a local PSTN gateway 22. The plurality of analog phones 16 may be part of a local PSTN 20. Thus, the plurality of analog phones 16 may access the VoIP system 10 locally using known techniques.

Additionally, various "Session Initiation Protocol" (SIP) phones 18 may be coupled to the IP network 12 via a SIP gateway 19, for example. A plurality of IP phones 26 and/or computers 28, for example, may also be coupled to the IP network 12 via various media gateways 24 and/or various routers 30. Additionally, various H.323 phones 32 may be coupled to the IP network 12 via an H.323 gateway 34, for example.

Each computer 28 may have, for example, a pair of speakers and a microphone (not shown), or may have a headset with a microphone (not shown). Alternatively, a computer video camera with a microphone may be coupled to the computer 28 (not shown). The computer 28 may be a personal computer (PC) configured as a multimedia computer, a mobile computing device such as a laptop computer or the like. The computer 28 may execute logic, e.g., software, in order to place a VoIP call.

As will be appreciated, the analog phones 16, the SIP phones 18, the IP phones 26, the computers 28, the H.323 phones 32, etc., via their respective gateways or routers, represent VoIP clients within the VoIP system 10. The VoIP clients are each capable of making and receiving telephone calls via the IP network 12 by transmitting and receiving digital voice data packets therebetween. The actual procedures and protocols for exchanging such data employs conventional VoIP techniques except as otherwise described herein. Thus, the description herein focuses primarily on the inventive aspects.

Next, the general operation of the VoIP system 10 will be described. As previously mentioned, the VoIP system 10 utilizes VoIP technology to allow voice calls to be originated and terminated on various types of platforms over the IP network 12. For example, the analog phones 16 supported by a conventional PSTN can place and receive calls over the IP network 12. Alternatively, a SIP phone 18, an IP phone 26 or a H.323 phone 32 can place a call to an analog phone 16 on a local PSTN. The local PSTN may be in another city, state or country. Further still, a computer 28 can call another computer 28, a SIP phone 18, an IP phone 26, an analog phone 16, a cell phone (not shown), a satellite phone (not shown) or the like, or a combination thereof.

In yet another alternative, any of the aforementioned VoIP clients may place a call to a VoIP proxy server which hosts special services. For example, a VoIP proxy server may host voice mail or video mail. A VoIP client can connect to the VoIP proxy server to retrieve voice or video mail in an otherwise conventional manner.

The VoIP technology translates a destination telephone number into a data network address ("IP address") associated with a corresponding terminating gateway nearest to the destination number. Using an appropriate protocol and packet transmission over the IP network 12, the terminating gateway will transmit the call directly to the VoIP client or initiate a call to the destination phone number over the local PSTN 20 at the receiving destination to completely establish end-to-end two-way communications. Despite the additional connections required, the overall call setup time is not significantly longer than with a call fully supported by a conventional PSTN.

In general, in order to complete a call by accessing the VoIP proxy servers on the IP network 12, a VoIP client establishes a connection with the load monitor 14. Next, the VoIP client queries the load monitor 14 for the identity of a VoIP proxy server to connect with in order to complete the call. The load monitor 14 either previously identifies or proceeds to identify the optimal VoIP proxy server. The load monitor 14 determines and identifies the optimal VoIP proxy server based on which VoIP proxy server has the lowest workload. Such identification may be by an IP address, for example. Next, the load monitor 14 prepares a response to the client query and transmits the response to the querying VoIP client. Once the response is received by the VoIP client, the VoIP client then connects to the VoIP proxy server identified in order to establish the call in an otherwise conventional manner.

Thus, the VoIP client wishing to make a call via the IP network 12 first queries the load monitor 14 to ascertain which VoIP proxy server #1 through #N is experiencing the lowest workload. The VoIP client then establishes the call through that particular VoIP proxy server. In this manner, the present invention helps to avoid one or more VoIP proxy servers shouldering the majority of the workload while other of the VoIP proxy servers are underutilized at any given moment in time. This way, more optimum network connections may be established for each call, thereby reducing latency time, etc.

In the VoIP system 10, voice signals are digitized and transmitted as a stream of packets over the IP network 12. The IP network 12 allows each packet to independently find the most efficient path to the intended destination, thereby best using the network resources at any given instant The packets associated with a single source may thus take many different paths to the destination in traversing the IP network 12, arriving with different end-to-end delays, arriving out of sequence, or possibly not arriving at all. At the destination, however, the packets are re-assembled and converted back into the original voice signal. VoIP technology insures proper reconstruction of the voice signals, compensating for echoes made audible due to the end-to-end delay, for jitter, and for dropped packets, etc.

Figure 2:
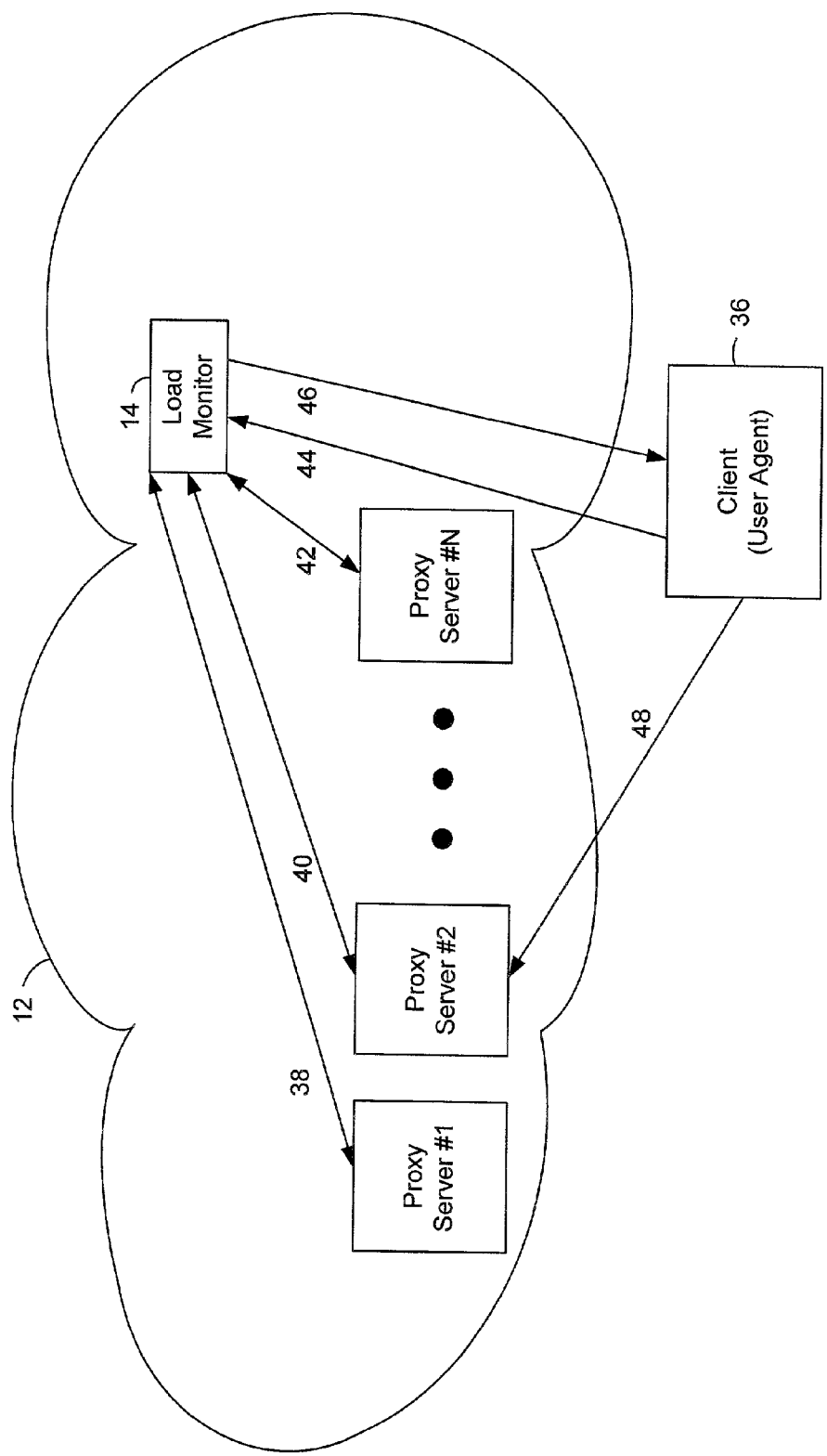
FIG. 2 is a detailed schematic flow diagram representing a VoIP client connecting to the VoIP system using the load monitor in an embodiment of the present invention.

Turning now to FIG. 2, the IP network 12 is shown enlarged with a representative VoIP client 36 (hereinafter, client 36) attempting to connect to a VoIP proxy server in order to complete a VoIP call in accordance with the invention. The VoIP client 36 may be any device capable of transmitting and receiving voice data over a VoIP system. For example, the client 36 may take the form of one of the analog phones 16, the SIP phones 18, the IP phones 26, the computers 28, etc., which connect to the IP network 12 via its respective gateway or router. The steps of the call connection process will now be further explained with reference to FIGS. 3–5.

Figure 3:
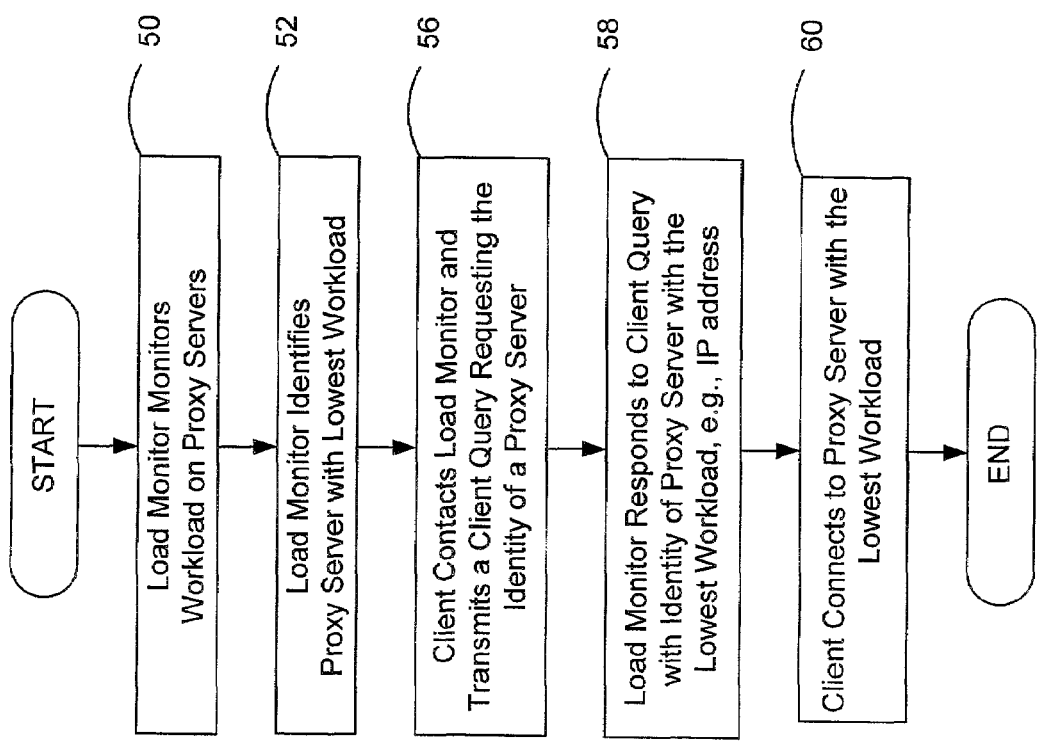
FIG. 3 is a flow diagram of a method for employing the load monitor according to the present invention.

Referring now to FIG. 3, the overall process is shown for identifying a VoIP proxy server on the VoIP system 10 in accordance with the present invention. In step 50, the load monitor 14 monitors the workload of each VoIP proxy server #1 through #N. (Such monitoring of the workload data is represented, for example, by network connections 38, 40 and 42 in FIG. 2.) The workload data may be passed spontaneously by the VoIP proxy servers to the load monitor 14. Alternatively, the load monitor 14 may periodically poll the VoIP proxy servers #1 through #N for their respective workload data. Further still, the load monitor 14 may continuously collect the workload data.

Next in step 52, the load monitor 14 identifies which VoIP proxy server has the lowest workload. This is done by comparing the workload data provided to the load monitor 14 from the VoIP proxy servers #1 through #N. The particular manner in which the lowest workload is determined can be based on any of a variety of predetermined criteria including, for example, the amount of data being processed per second, the number of clients, etc. The present invention is not intended to be limited necessarily to any particular criteria for establishing the lowest workload.

Next in step 56, the load monitor 14 receives a client query from the client 36 requesting the identity of the VoIP proxy server having the lowest workload in order to place a VoIP call. The client query is represented by a network connection line 44 in FIG. 2.

Next in step 58, the load monitor 14 responds to the client query from the client 36 by providing the identity of the VoIP proxy server currently having the lowest workload. The response from load monitor 14 that provides the identity of the VoIP proxy server to the client 36 is represented by a network connection line 46 in FIG. 2. The identity of the server may be, for example, an IP address or the like which the load monitor 14 provides to the client 36.

Next in step 60, the client 36 connects to the VoIP proxy server identified as having the lowest workload using known network protocols, etc. For example, in FIG. 2, VoIP proxy server #2 represents the VoIP proxy server identified as having the lowest workload. Client 36 connects to the VoIP proxy server #2 via a network connection line 48 in order to complete the VoIP call in otherwise conventional fashion.

Figure 4:
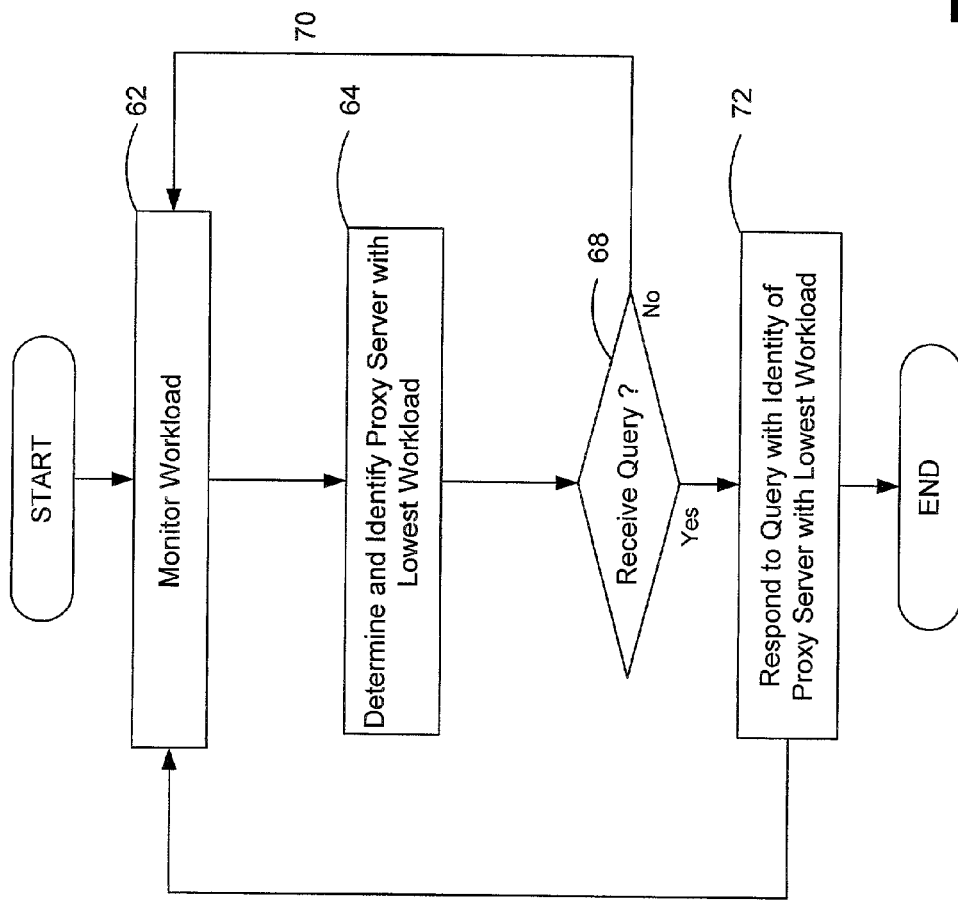
FIG. 4 is a flow diagram of a method for identifying the VoIP proxy server with the lowest workload according to an embodiment of the present invention.

Now referring to FIG. 4, the specific steps carried out by the load monitor 14 for identifying the server with the lowest workload will be described. In step 62, the load monitor 14 may be configured to receive workload information from each of the VoIP proxy servers. The workload information may be provided in a plurality of ways, for example, the load monitor 14 may receive statistics from the respective VoIP proxy servers as to the current workload of each VoIP proxy server. Alternatively, the load monitor 14 may initiate a ping and await the response to that ping in order to determine and identify which VoIP proxy server currently has the lowest workload. In another embodiment, the VoIP proxy servers may be configured to spontaneously report their workload to the load monitor 14. In yet another embodiment, the load monitor 14 may wait until the client query is received from the client 36 before initiating a monitoring program.

In step 64, the load monitor 14 identifies which VoIP proxy server has the lowest workload. This is done by comparing the workload data provided to the load monitor 14 from the VoIP proxy servers, #1 through #N. The particular manner in which the lowest workload is determined can be based on any of a variety of predetermined criteria as noted above. The present invention is not intended to be limited necessarily to any particular criteria for establishing the lowest workload.

In the case where two or more VoIP proxy servers have the same lowest workload, one VoIP proxy server will be selected to handle the call. The particular manner in which the one VoIP proxy server is selected can be based on any of a variety of predetermined criteria including, for example, the proximity to the originating gateway, historical average workload, etc. The present invention is not intended to be limited necessarily to any particular criteria for selecting one VoIP Proxy server over another when both have the same lowest workload.

Next in step 68, the load monitor 14 determines whether it has received the client query. If the answer is "no", then the load monitor 14 proceeds to continue to monitor the workloads of the VoIP proxy servers as represented by line 70. However, if the answer is "yes", then the load monitor 14 moves to step 72.

In step 72, the load monitor 14 prepares and transmits a packet containing the identity of the VoIP proxy server with the lowest workload to the client 36.

Figure 5:
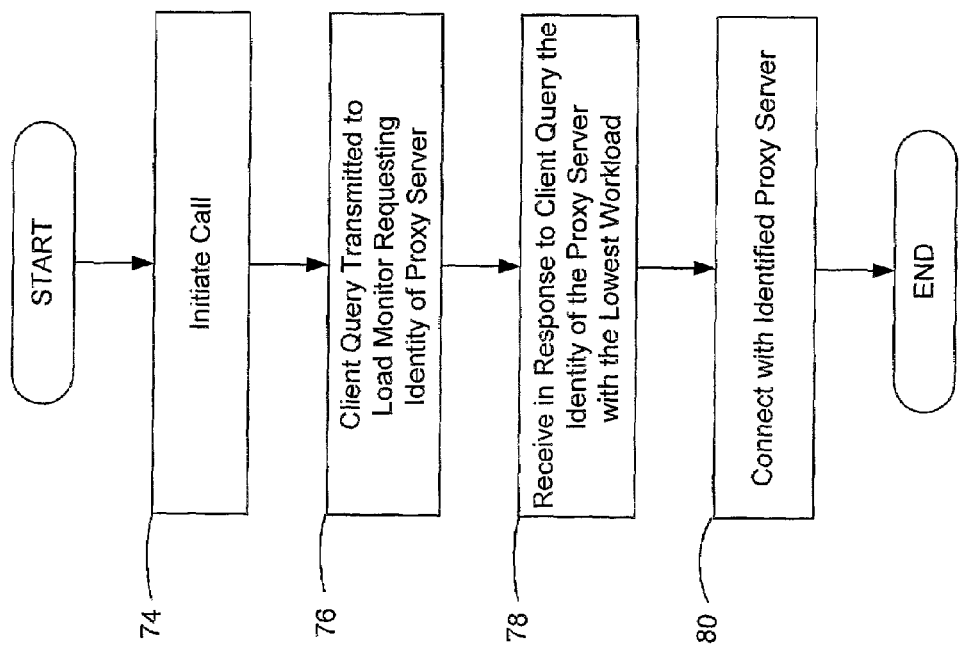
FIG. 5 is a flow diagram of a method for querying the load monitor to connect to the VoIP proxy server with the lowest workload according an embodiment of the present invention.

Now referring to FIG. 5, the steps carried out by the VoIP client making the call and requesting the identity of the VoIP proxy server with the lowest workload will be described. In step 74, a user of the VoIP system 10 initiates a call on the VoIP system 10 via a VoIP client (e.g., the analog phones 16, the SIP phones 18, the IP phones 26, etc.). The user may, for example, pick up the receiver of the IP phone 26. Alternatively, the user may execute a VoIP program on a VoIP compatible computer 28. Further still, the user may pick up a receiver of the analog phone 16. In step 76, the VoIP client transmits the client query to the load monitor 14 (represented by network connection line 44 in FIG. 2). As previously described, such client query asks the load monitor 14 which VoIP proxy server currently has the lowest workload. Next in step 78, the client 36 receives a packet from the load monitor 14 containing the response to the client query including the identity of the VoIP proxy server with the lowest workload. The client 36 then proceeds to connect with the identified VoIP proxy server as represented by line 48 (FIG. 2), in step 80 in order to establish the call in an otherwise conventional manner.

In yet another embodiment, a subnet of the entire VoIP proxy server network may be configured to transmit the workload information between the VoIP proxy servers and the load monitor 14. In another embodiment, there could exist redundant load monitors 14 for fault tolerance. In yet another embodiment, the VoIP proxy servers may be configured to broadcast network packets. By this means, each VoIP proxy server can send its workload information to multiple load monitors 14 simultaneously instead of via separate packets.

It will further be appreciated that the VoIP system 10 may alternatively have configurations other than the configurations shown in FIG. 1. Thus, there has been disclosed a system and method of identifying the VoIP proxy server with the lowest workload and providing such identity to a VoIP client so the VoIP client may connect to the VoIP system in order to make a VoiP call. This method permits the more efficient use of the VoIP proxy servers by balancing the workload among the VoIP proxy servers more efficiently. Additionally, although the flow charts of FIGS. 3–5 show a specific order of execution, it is understood that the order of execution may differ from that which is depicted. For example, the order of execution of two or more blocks may be scrambled relative to the order shown. In addition, two or more blocks shown in succession in FIGS. 3–5 may be executed concurrently or with partial concurrence.

The load monitor 14 itself may be a discrete device incorporated into the network, or alternatively be part of another device such as one of the VoIP proxy servers or gateways.

It will be appreciated that each of the respective devices described herein is programmed via conventional computer programming techniques to execute machine-readable code in order to carry out the operations described herein. Such programming may be easily performed by those having ordinary skill in the art of computer programming and IP technology based on the disclosure herein. Accordingly, the particular details of such programming code have been omitted for the sake of brevity.

Although particular embodiments of the invention have been described in detail, it is understood that the invention is not limited correspondingly in scope, but includes all changes, modifications and equivalents coming within the spirit and terms of the claims appended hereto.

What is claimed is:

1. A method of balancing workload in a Voice-over-Internet Protocol (VoIP) system having at least one VoIP client, a plurality of VoIP proxy servers and a load monitor, comprising:
   receiving a query from the VoIP client with the load monitor, the query requesting an identity of the VoIP proxy server among the plurality of VoIP proxy servers that has the lowest workload;
   with the load monitor, determining the identity of the VoIP proxy server among the plurality of VoIP proxy servers that has the lowest workload by comparing workload data received from each VoIP proxy server;
   transmitting the identity of the VoIP proxy server among the plurality of VoIP proxy servers that has the lowest workload from the load monitor to the VoIP client; and
   the VoIP client communicating with the identified VoIP proxy server to initiate a VoIP call.

2. The method of claim 1, further comprising polling each VoIP proxy server for the workload data with the load monitor on a periodic basis.

3. The method of claim 1, wherein each of the VoIP proxy servers spontaneously report workload data to the load monitor.

4. The method of claim 1, wherein workload data is continuously collected by the load monitor from each of the VoIP proxy servers.

5. The method of claim 1, wherein the load monitor collects the workload data from the VoIP proxy servers after receipt of the query from the VoIP client.

6. The method of claim 1, wherein if two or more of the VoIP proxy servers have the lowest workload, the load manager selects one of the VoIP proxy servers to identify to the VoIP client.

7. The method of claim 6, wherein the selection is made based on VoIP proxy server proximity to a gateway through which the VoIP communicates.

8. The method of claim 6, wherein the selection is made based on a historical workload statistic.

* * * * *

UNITED STATES PATENT AND TRADEMARK OFFICE
CERTIFICATE OF CORRECTION

| | | |
|---|---|---|
| PATENT NO. | : 7,065,043 B2 | Page 1 of 1 |
| APPLICATION NO. | : 10/036001 | |
| DATED | : June 20, 2006 | |
| INVENTOR(S) | : Wu et al. | |

It is certified that error appears in the above-identified patent and that said Letters Patent is hereby corrected as shown below:

Field 56 (References cited), replace "WO 01/05515" with --WO 01/05115--.

Col. 3, ln. 31, replace "VoiP" with --VoIP--.

Col. 6, ln. 16, replace "VoiP" with --VoIP--.

Col. 7, ln. 33, replace "VoIP" with --VoIP--.

Signed and Sealed this

Twenty-second Day of August, 2006

JON W. DUDAS
*Director of the United States Patent and Trademark Office*